United States Patent

[11] 3,614,126

| | | |
|---|---|---|
| [72] | Inventor | Norman C. Carlson<br>c/o Auto Safety, Inc., Chetek, Wis. 54728 |
| [21] | Appl. No. | 857,267 |
| [22] | Filed | Aug. 11, 1969 |
| [45] | Patented | Oct. 19, 1971<br>Continuation-in-part of application Ser. No. 808,393, Mar. 19, 1969. |

[54] STABILIZING DEVICE FOR AUTOMOTIVE VEHICLES
24 Claims, 11 Drawing Figs.

[52] U.S. Cl. .............................................. 280/150 D
[51] Int. Cl. ................................................ B60r 27/00
[50] Field of Search ................................... 280/150 D

[56] References Cited
UNITED STATES PATENTS
3,438,648   4/1969   Tolley ......................... 280/150 D
FOREIGN PATENTS
899,154   12/1953   Germany ..................... 280/150 D
1,031,776   3/1953   France ........................ 280/150 D

*Primary Examiner*—Leo Friaglia
*Assistant Examiner*—Robert R. Song
*Attorney*—Carlsen, Carlsen, Sturm and Wicks

ABSTRACT: Apparatus for stabilizing and reducing the tendency of a vehicle to skid in response to transient forces that may be exerted upon the vehicle which consists of one or more masses adapted to be disposed upon the vehicle so that substantially universal pivotal movement of the center of gravity of the mass about a point may be realized as the vehicle is subjected to such transient forces.

PATENTED OCT 19 1971   3,614,126
SHEET 1 OF 4
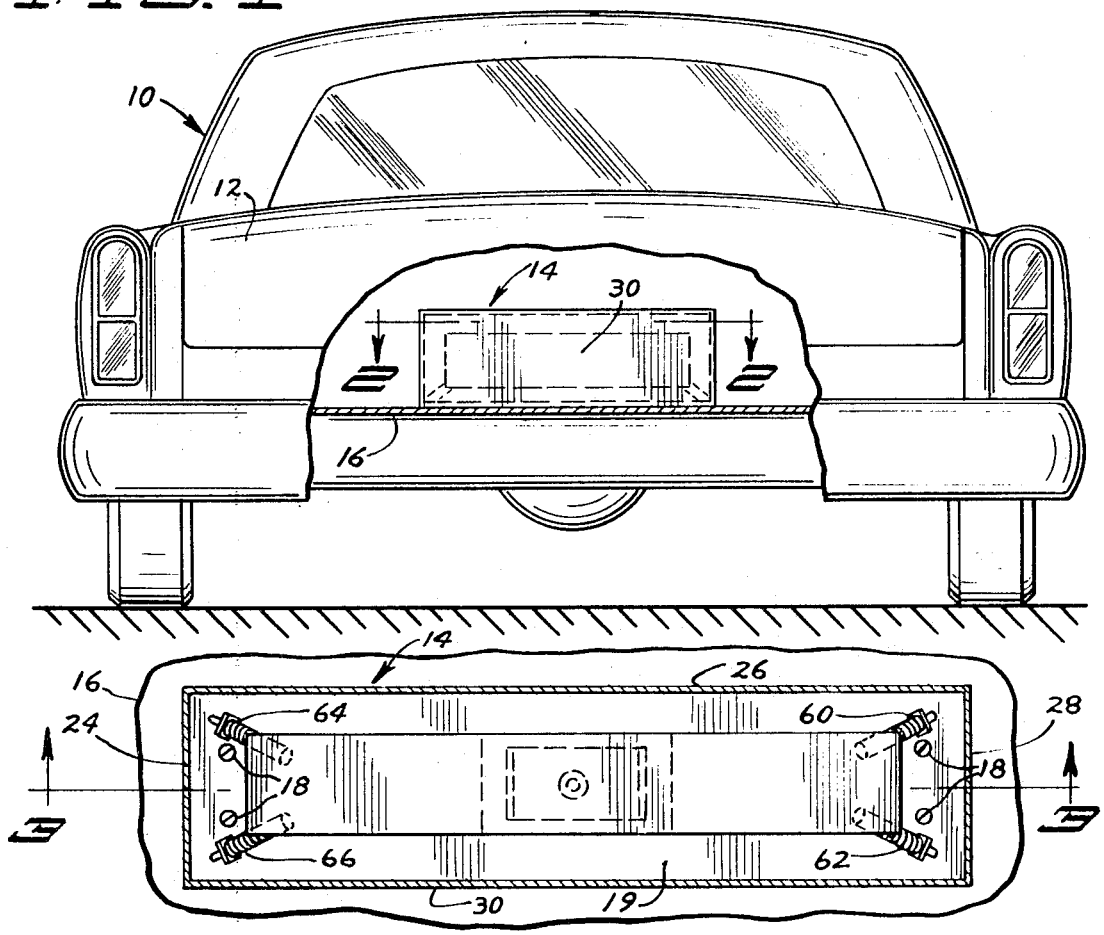
FIG. 1
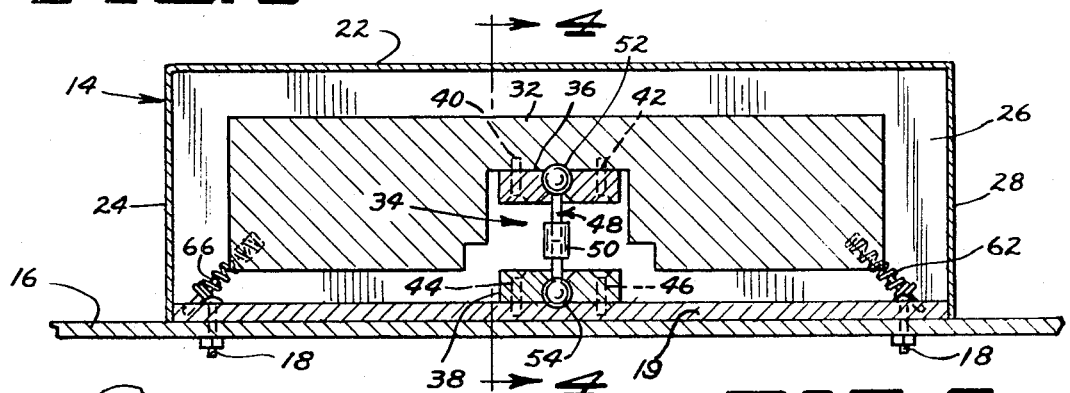
FIG. 2
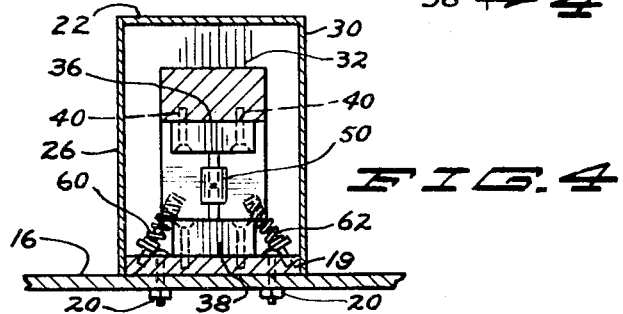
FIG. 4
FIG. 3
INVENTOR.
NORMAN C. CARLSON
BY Carlson, Carlson,
Sturm & Dicke
ATTORNEYS

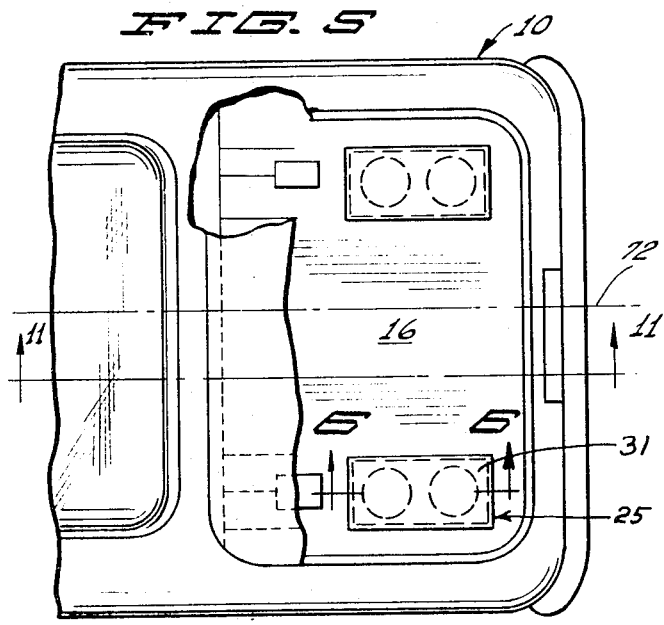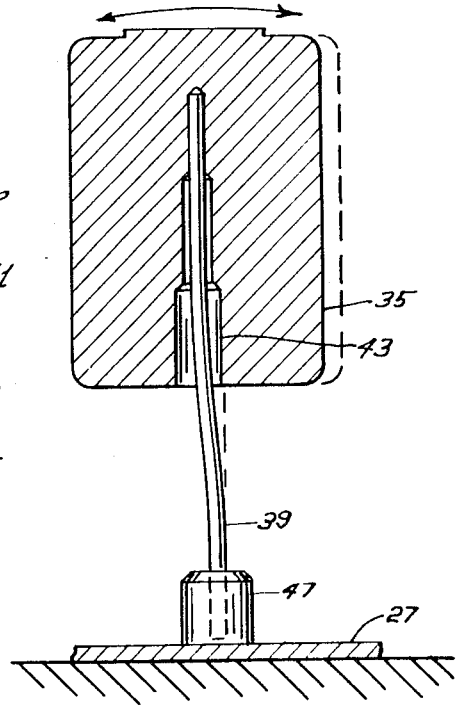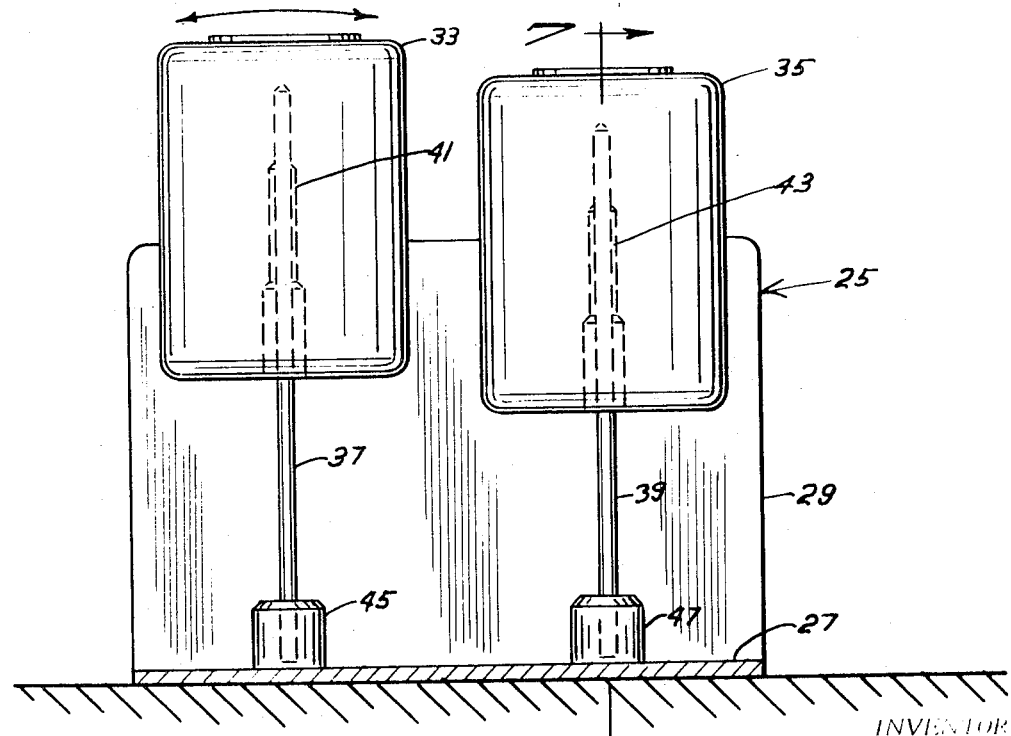

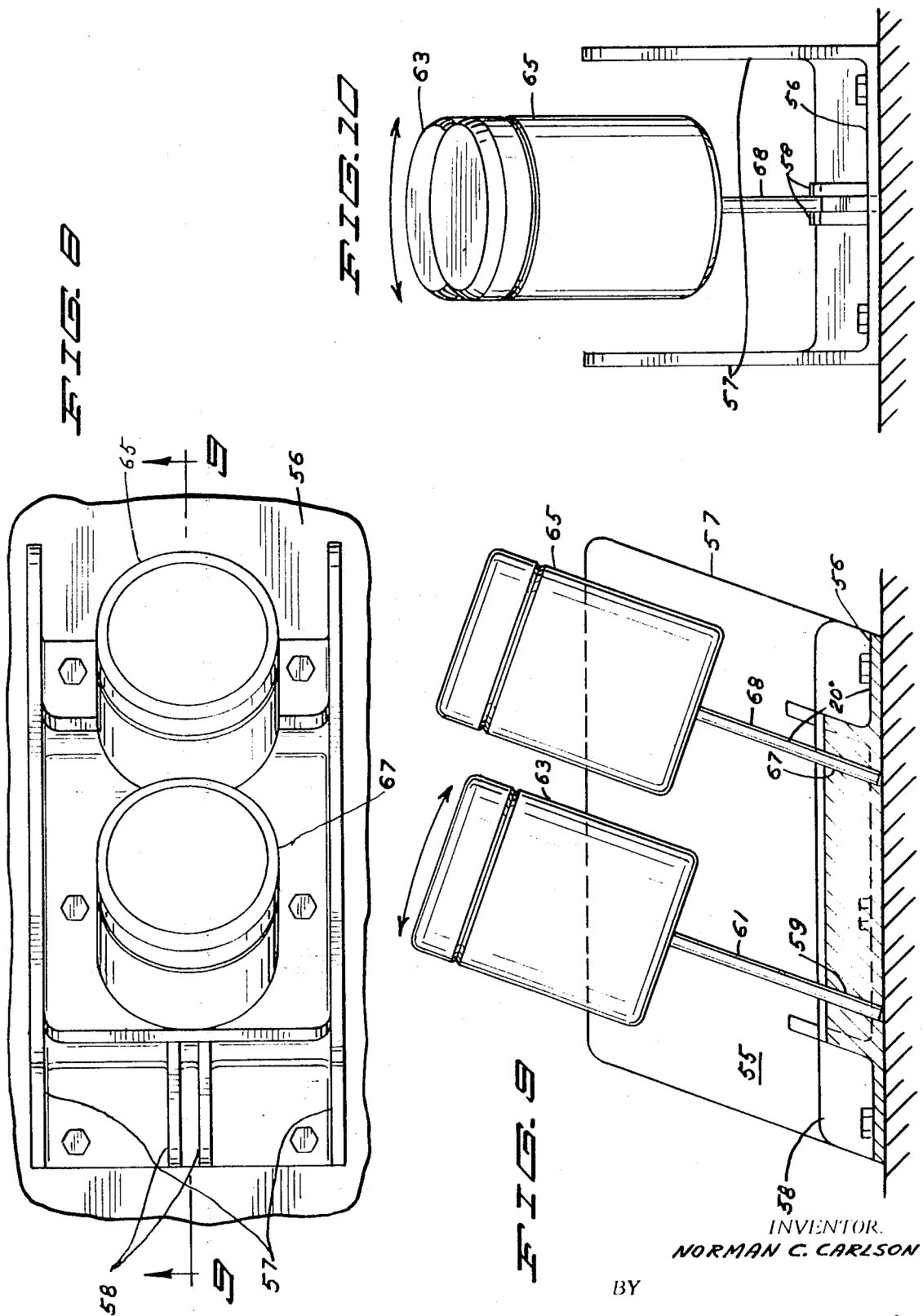

PATENTED OCT 19 1971

INVENTOR.
NORMAN C. CARLSON

BY
Carlsen Carlson & Sturm
& Dicks ATTORNEYS

STABILIZING DEVICE FOR AUTOMOTIVE VEHICLES

This is a continuation-in-part of an earlier filed application in the name of Norman C. Carlson, having a Ser. No. 808,393, filed Mar. 19, 1969.

A device of this general nature may comprise a mass supported upon a rodlike member that is in turn rigidly supported on a base member that may be suitably mounted or affixed to a vehicle. It may also be noted that certain forms of the device may be made to provide a greater response and reaction along a particular axis within the spherical surface of movement as determined by the disposition and/or characteristics of the support for the mass, with respect to the base to which it is connected.

A device for stabilizing vehicles and reducing the tendency of a vehicle to skid which consists of a mass adapted to be disposed within a vehicle, for example, in the trunk of a vehicle, and supported for universal pivotal movement about its own center of mass and at the same time for universal swinging movement through a sector of a spherical surface disposed generally in a horizontal plane, this makes possible movement in effect in any direction within a horizontal plane extending through the approximate center of the mass. Suitable resilient elements such as springs provide a biasing force to tend to center the mass and return it to its initial position after it has been displaced therefrom, due to the movement of the vehicle. A supporting rod, universally connected at both its upper and lower ends between the mass and a baseplate serves as a universal mounting for the mass. During use, the mass is free to pitch, roll and yaw as well as undergo translatory movement within the generally horizontally disposed spherical surface.

The present invention relates to vehicle stabilization and more particularly to a device for stabilizing vehicles of the type in which a mass is resiliently mounted within the vehicle for producing opposing forces tending to oppose rapid or erratic movement of the vehicle.

Numerous vehicle stabilization systems have been previously proposed. In many of these systems the mass is free to slide along a single axis as, for example, by mounting a weight so that it is free to slide along a rod extending transversely between the rear wheels. Because of the limited movement it will be understood that force vectors to which the mass is subjected other than those along the longitudinal axis of motion, the free movement will be entirely uncompensated. Thus, the mass is entirely ineffective for stabilizing the vehicle except with regard to the forces exerted along the axis in which it is free to move.

In an attempt to correct this shortcoming, stabilizing devices have been proposed in which a weight is mounted for movement both vertically and laterally, for example, by providing vertical and lateral slots which act as guides to permit movement of the mass in these directions. Devices of this kind are again severely limited with regard to external force vectors for which stabilization can be provided by the mass.

In view of these and occurring deficiencies of the prior art it is one object of the present invention to provide an improved stabilizing device for automobiles and other vehicles in which a resiliently mounted mass is provided with a means that serves to compensate for pitch, roll and yaw of the vehicle as well as sudden translatory movement in a substantially horizontal plane in any direction, with the above movement occuring either singly, jointly or in any combination.

Another object of the invention is the provision of a vehicular stabilization device of the kind described in which the mass is supported upon one or more bearings that permit the mass to move with very little friction and at the same time normally prevent the weight of the mass from being supported entirely by support springs or other resilient biasing support members.

A further object of the invention is the provision of an improved vehicle-stabilizing device which is rugged in construction, lends itself to mass production at a reasonable cost and is reliable in operation.

A further object of the invention is the provision of an improved vehicle-stabilizing device in which a single supporting element is capable of permitting movement of the mass in many different directions but at the same time provides adequate support for the mass thereby simplifying the construction of the device.

A further object of the invention is the provision of an improved vehicle stabilizer of the type described which can easily be assembled and installed and requires a minimum of maintenance. For the purpose of this application I have elected to show certain forms and details of an automobile stabilizer that is representative of my invention. It is to be understood that the embodiment of the invention herein shown and described is for the purposes of illustration only and that many variations will be apparent to those skilled in this art upon understanding the principles of my invention.

These and other more detailed and specific objects will be disclosed in the course of the following specification, reference being had to the accompanying drawings, in which:

FIG. 1 is a partially broken away rear elevational view of a vehicle in which a stabilizer constructed in accordance with the principles of the invention is mounted within the trunk;

FIG. 2 is a horizontal sectional view taken on section line 2—2 of FIG. 1 on an enlarged scale;

FIG. 3 is a vertical sectional view taken on section line 3—3 of FIG. 2;

FIG. 4 is a vertical sectional view taken on section line 4—4 of FIG. 2;

FIG. 5 is a top fragmentary view of the rear portion of a vehicle with the trunk lid removed showing a typical installation of a further embodiment of my invention;

FIG. 6 is an enlarged, partial sectional view of a further embodiment of my invention taken along lines 6—6 on FIG. 5;

FIG. 7 is a sectional view of a portion of FIG. 6 taken along section lines 7—7 on FIG. 6;

FIG. 8 is a top plan view of another embodiment of my invention;

FIG. 9 is a partial sectional view taken along section lines 9—9 on FIG. 8; and

FIG. 10 is a rear elevation view of the apparatus of the embodiment of FIG. 8.

Figure 11:
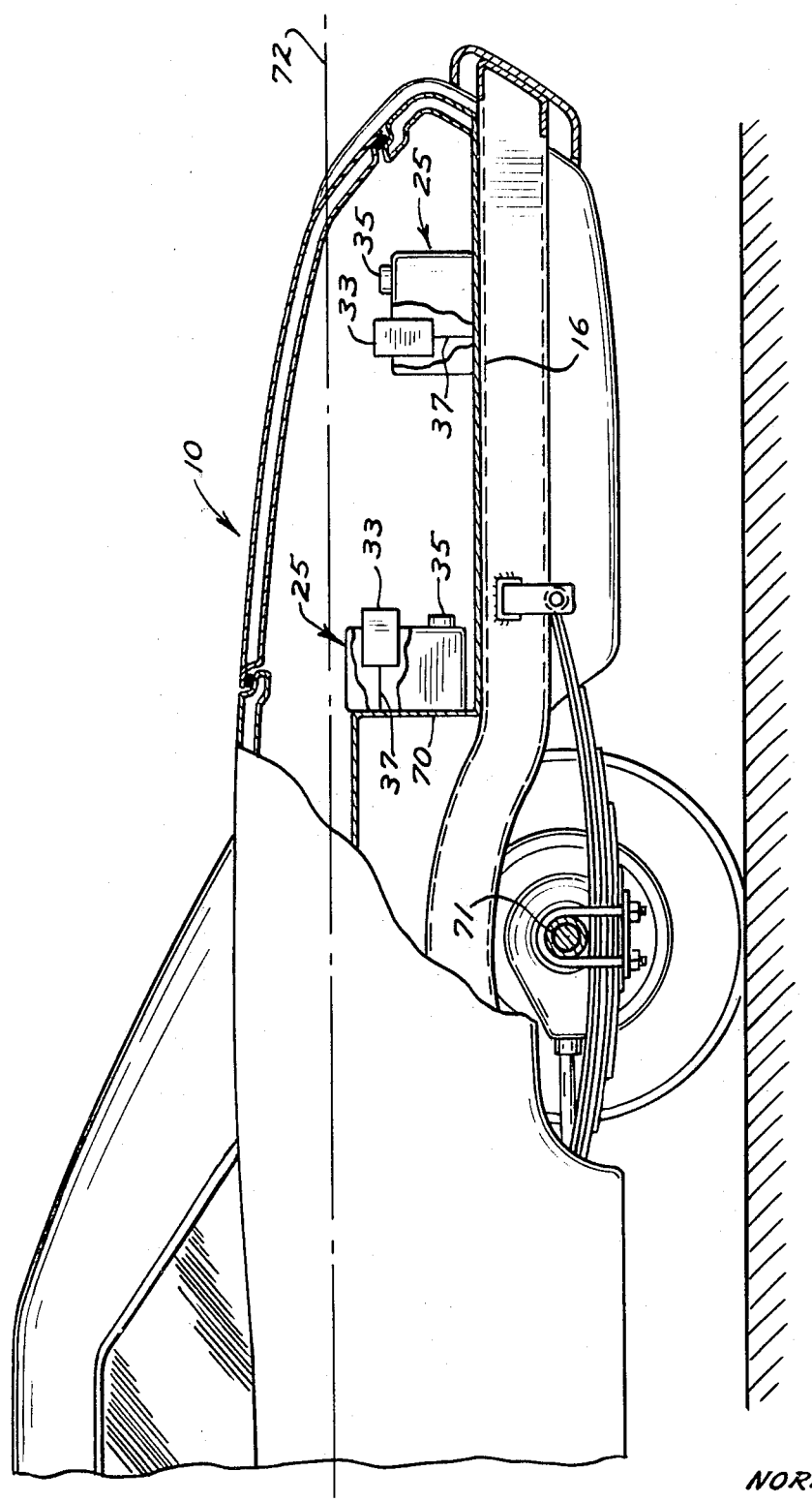

FIG. 11 is a partial sectional view of the apparatus shown in FIG. 5, taken along section line 11—11. As seen in the drawings, a vehicle 10 includes the usual trunk with a lid 12 and it is within the trunk that the stabilizer 14 embodying my invention is mounted. It is understood, however, that it can be mounted at other points within the vehicle and the term "within" as used herein could include mounting the stabilizer externally.

Stabilizer 14 is secured to the trunk floor 16 by suitable fasteners such as bolts 18 (FIGS. 2, 3 and 4) which extend upwardly through suitable openings in a boxlike housing having a base composed of a bottom plate 19, vertical walls 24, 26, 28 and 30 and a top 22. The housing is preferably formed from metal but can be formed from other materials as desired.

Mounted within the housing is a mass 32 which functions to provide stabilization for the vehicle. Mass 32 is shown generally rectangular and somewhat elongated in a transverse or lateral direction. It is approximately seven times as wide as it is thick (from the front to the rear surface thereof). Mass 32 is provided with a central upwardly extending recess 34 on its lower surface to receive a supporting element which will be described below. Mass 32 is shown rotatably supported by balancing rod 48. To hold the balancing rod in place bearing covers 36 and 38 are secured to the upper surface of the recess 34 and to the plate 19 respectively by screws 40, 42 and 44, 46 respectively. Within each of the bearing covers and the mating surfaces of the mass 32 and the plate 19 are provided spherical recesses which serve as sockets for receiving balls 52 and 54 that form the ends of the balancing rod 48. To facilitate assembly the balancing rod 48 is divided into two parts at its center which are held within a sleeve 50 by suitable retaining pins or the like.

Mass 32 is maintained in its initial undeflected position as shown in the drawings by resilient elements which comprise four obliquely disposed helical springs 60, 62, 64 and 66 that are fastened at their lower ends to the plate 19. Their upward ends project into suitable oblique recesses within the lower corners of mass 32. It will be noted that the springs are shown inclined toward the center of the mass as seen from above in FIG. 2 as well as being inclined upwardly and centrally when seen in rear elevation as in FIG. 3 or in side elevation as seen in FIG. 4. In one embodiment of my invention it was found convenient to orient the springs on the left toward the approximate center of the left half of mass 32 and to orient the springs on the right toward the approximate center of the right half of mass 32.

The present invention has a number of advantages, the primary one being that it is capable of compensating the translatory movement of the vehicle viz acceleration, deceleration or lateral movement at the rear end of the vehicle while at the same time compensating for rapid rotational movement of the vehicle about a vertical axis (i.e., yaw) and in practice these movements are often found to occur simultaneously when the vehicle is either skidding or skidding is incipient. The stabilizer is also capable of compensating for pitching or rolling movement of the vehicle as would occur when one wheel suddenly strikes an obstacle or depression.

Referring to FIGS. 5–7 of the drawings, vehicle 10 is shown having a pair of stabilizer assembly devices 25 disposed and mounted upon the floor of the trunk and it will be noted that the generally longitudinal axis of the stabilizer assemblies 25 is disposed in the normal direction of travel of the vehicle 10.

Stabilizer assembly 25 includes a base member 27, a pair of side walls 29 and a cover member 31, all of which are used to shield the movable masses from undesirable interference due to the presence of other objects in the truck of the vehicle.

Stabilizer assembly 25 further includes a first mass member 33 and a second mass member 35, each of which is supported on the top end of support means 37 and 39 respectively. The lower ends of support means 37 and 39 are shown rigidly disposed and mounted in support holders 45 and 47 respectively, which are preferably securely mounted upon base 27 as by welding or the like.

It may be noted that each of the mass members 33 and 35 are provided with graduated upwardly extending apertures 41 and 43 respectively for mounting the mass members upon the upper ends of supporting means 37 and 39 at a point above the center of gravity of the respective mass members and such mountings may preferably be effected through the use of a suitable adhesive, or the like means which will securely hold mass members 33 and 35 on the top ends of supporting means 37 and 39.

Supporting means 37 and 39 may be comprised of spring material which will tend to remain in the position shown in FIG. 6 of the drawings but which, under the influence of forces applied to mass members 33 and 35, are capable of resilient deformation, the initial deformation of which may be seen in FIG. 7 of the drawing in which the slight initial movement of the mass is indicated by its displacement from the dotted outline indicating the rest position. Under these conditions, it will be seen that support means 39 assumes a generally S-shaped configuration.

It may also be noted that mass members 33 and 35 are disposed at differing heights with respect to base 27 which may conveniently be provided by making supporting means 37 and 39 of different lengths. In this embodiment, the disposition of the mass members at different heights serves to tend to eliminate the possibility of undue vibration of the stabilizer assembly from resonance of the system. Further, in the embodiment shown in FIGS. 5–7, successful operation has been obtained through the use of one stabilizer assembly 25 disposed and oriented in any particular manner on the vehicle. However, the most satisfactory operation is believed to be obtainable where a substantial distance from the axle and wheel of the rear end of the vehicle is provided so that the moment arm through which the forces generated by the reactive movement of the masses, are substantial.

The operation of the embodiment of FIGS. 5–7 is believed to be similar to that obtained in the above-described embodiment and will provide compensation for translational or rotational movement of the vehicle about all three of its axes in response to transient forces as might be imposed by the operator of the vehicle of external means.

Referring to FIGS. 8–10 of the drawings, a further embodiment of my invention is indicated generally as a stabilizer assembly 55. Stabilizer 55 includes a base member 56 that is shown having a pair of parallelly disposed sidewalls 57 at each side and generally longitudinally extending parallelly disposed rib portions 58 extending upwardly for a small distance. Rib members 58 may further be supported by transversely extending rib portions disposed in proximity to apertures 59 and 67 disposed intermediate members 58 and at approximately a 20° angle with respect to the plane of base 56. A pair of spring support members 61 and 68 are shown disposed in apertures 59 and 67 and are preferably rigidly connected therein by suitable means (not shown). It may also be noted that the preferred embodiment again provides support means 61 and 68 of differing lengths with support means 61 (the longer support) disposed at the forward end of base 56.

Mass member, 63, is shown rigidly disposed upon the top of spring support means 61 and a further mass member, 65, is likewise shown rigidly supported on the top of spring support means 68. In both cases, a suitable aperture extending downwardly from the interior of mass member 63 and 65 may take the form of the graduated opening shown in FIG. 7 of the drawings. Again, the masses 63 and 65 are preferably supportively engaged at a point above their respective centers of gravity.

In the embodiment of FIGS. 8–10 stabilizer assembly 55 is constructed to provide a more or less preferred axis of response to transient forces and thus the left end of FIGS. 8 and 9 may be referred to as the front end so that when the devices are disposed upon a vehicle, the front end is disposed toward the front of the vehicle and the device exhibits a preferred response in a direction which will assist the operator in braking the vehicle to a rapid stop. The angle of rearward inclination of support means 61 and 68 is preferably an angle which will, under the normal expected transient forces, prevent the support means 61 and 68 from assuming a vertical disposition with respect to base 56. The angle of 20° with respect to a vertical line passing through the plane of base 56 has been determined to be satisfactory in one operative embodiment of my invention.

FIG. 11 is a fragmentary sectional view of FIG. 5 of the drawing which has been provided to further illustrate the relative disposition of my invention in the interior of the trunk of a vehicle 10. In FIG. 11, alternative disposition of the base 27 of stabilizer assembly 25 are illustrated. As has been set forth above, apparatus embodying the principles of my invention may be disposed at various locations on or in a vehicle to effect the stabilization desired by the user.

Referring back to FIG. 11, a vehicle 10 is shown having a trunk which includes a horizontal floor 16 and a generally vertical portion 70 extending upwardly therefrom at its forward extremity. Vehicle 10 is also shown as having a generally longitudinal axis 72 and includes an axle 71 extending generally transverse to said longitudinal axis 72. A first stabilizer assembly 25 is shown horizontally disposed on horizontal member 16 and support means 39 for mass 33 is shown in a generally vertical position whereat it is disposed generally in an attitude that is normal to longitudinal axis 72.

Similarly, a further stabilizer assembly 25 is shown with its base mounted on vertical portion 70 of the trunk of vehicle 10 wherein supporting means 37 for mass 33 is disposed generally parallel to longitudinal axis 72 on vehicle 10. In the last-noted disposition of the apparatus on the vehicle, it may be seen that mass means 33 is operative over a spherical surface in a plane that is generally vertical.

Other dispositions of stabilizer apparatus embodying the principles of my invention may occur to those skilled in the art upon installation and observation of the results obtained for various attitudes and positions on a vehicle.

My invention can be manufactured at a reasonable cost, requires little attention when in use and will perform reliably over an extended period of time.

It is contemplated that the principles of my invention may be embodied in other configurations of apparatus, dependent to some extent upon the particular compensation that may be necessary or desired. As one example, a mass, such as mass 32 may take the form of a disc that is pivotally supported at its center of mass and resiliently supported for limited restrained rotation thereabout, in three mutually perpendicular axes.

Having now therefore fully illustrated and described my invention, what I claim to be new and desire to protect by Letters Patent is:

1. An automobile stabilizer comprising; a base adapted to be mounted upon the chassis of a vehicle; mass means; mass means including a mass; and supporting means connected to said base and to said mass means, said supporting means being operative to permit spherical motion of said mass relative to said base and including spring means for maintaining said mass in a predetermined initial position relative to said base.

2. The stabilizer of claim 1 wherein the mass is movable in a generally horizontally disposed spherical surface and the supporting means includes a balancing rod disposed between the mass and the base and is rotatably mounted at one end whereby the mass is free to move in all directions.

3. The stabilizer of claim 1 wherein at least one substantially vertically disposed balancing rod is disposed between the mass and the base, said mass being positioned vertically of the base and one end of each such balancing rod is rotatable about three mutually perpendicular axes.

4. The stabilizer according to claim 1 wherein said supporting means includes a vertically disposed balancing rod universally connected to the mass and universally connected at its other end to the base whereby the mass is capable of undergoing pitch, yaw and roll as well as translatory movement within a selected plane.

5. The stabilizing apparatus of claim 1 wherein the supporting means includes a plurality of resilient support members connected between the base and the mass and at least some of the resilient members are obliquely positioned with reference to at least the horizontal plane.

6. The apparatus according to claim 5 wherein the resilient members comprise springs which are obliquely mounted both with reference to horizontal and vertical planes.

7. The stabilizer of claim 1 wherein the supporting means includes at least a pair of resilient means provided between the base and the mass at the left-hand side thereof and said resilient means are obliquely positioned to extend along axes that pass through substantially the center of the left-hand side of the mass and said at least a pair of resilient means are provided between the mass and the base on the right-hand side thereof and the latter resilient means are positioned on axes extending through substantially the center of the right-hand half of the mass.

8. The stabilizer of claim 1 wherein a vertically extending downwardly opening recess is provided in the lower surface of the mass, a balancing rod extends substantially vertically between the base from a point located below the mass upwardly into the recess and a ball and socket joint is disposed on at least one end of the balancing rod.

9. The apparatus according to claim 8 wherein a plurality of obliquely mounted resilient support members are disposed between the lower portions of the mass and the base and are positioned to extend upwardly and centrally thereof.

10. The apparatus of claim 1 which includes at least first and second inertial mass members; and supporting means for said mass members, each of said supporting means being in engagement with said base at one end thereof and with respective ones of said mass members at the other end thereof, whereby said mass members are independently supported about said one end of said supporting means for limited rotation thereabout.

11. The apparatus of claim 10 in which the supporting means are normally disposed in a position that is normal to the plane of the base.

12. The apparatus of claim 10 in which the supporting means are normally disposed at an angle with respect to the plane of the base.

13. The apparatus of claim 12 in which the supporting means are each disposed at a rearwardly extending angle with respect to the vehicle to be stabilized.

14. The apparatus of claim 13 in which the angle of disposition of the supporting means is in one direction.

15. The apparatus of claim 10 in which the base of the stabilizer is disposed on a vehicle so that the supporting means are normally extending in a direction parallel to the longitudinal axis of travel of said vehicle.

16. The apparatus of claim 10 in which the mass members are provided with downwardly opening apertures adapted to be disposed on corresponding ends of the supporting means.

17. The apparatus of claim 16 in which the apertures are substantially larger at the bottom portions thereof.

18. The apparatus of claim 1 in which the supporting means is rigidly mounted on the base at one end and extends into said mass at the other end for supportive engagement therewith, whereby said mass may be movable in a generally spherical surface.

19. The apparatus of claim 18 in which the mass is supported at a point above its center of gravity.

20. The apparatus of claim 19 in which the mass has an outwardly opening, graduated its other end.

21. The apparatus of claim 18 adapted to rigidly connect to the supporting means at its other end.

21. The apparatus of claim 18 in which the supporting means is normally disposed of right angles to the base.

21. The apparatus of claim 18 in which the supporting means is normally disposed at right angles to the base.

22. The apparatus of claim 18 in which the supporting means is normally disposed at an acute angle with respect to the base.

23. The apparatus of claim 1 in which the base of the stabilizer is disposed on a vehicle so that the supporting means is normally extending in a direction parallel to the longitudinal axis of travel of said vehicle.

24. The apparatus of claim 18 in which the base of the stabilizer is disposed on a vehicle so that the supporting means is normally extending in a direction parallel to the longitudinal axis of travel of said vehicle.